(12) United States Patent
Iijima

(10) Patent No.: US 11,782,031 B2
(45) Date of Patent: Oct. 10, 2023

(54) DETECTOR FOR LIQUID CHROMATOGRAPH

(71) Applicant: SHIMADZU CORPORATION, Kyoto (JP)

(72) Inventor: Yuki Iijima, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 0 days.

(21) Appl. No.: 17/576,254

(22) Filed: Jan. 14, 2022

(65) Prior Publication Data
US 2022/0244223 A1 Aug. 4, 2022

(30) Foreign Application Priority Data
Feb. 3, 2021 (JP) ................. 2021-016100

(51) Int. Cl.
*G01N 30/30* (2006.01)
*G01N 30/62* (2006.01)

(52) U.S. Cl.
CPC ............ *G01N 30/30* (2013.01); *G01N 30/62* (2013.01); *G01N 2030/3084* (2013.01)

(58) Field of Classification Search
CPC . G01N 30/30; G01N 30/62; G01N 2030/3084
See application file for complete search history.

(56) References Cited

U.S. PATENT DOCUMENTS

| 3,552,488 A | * | 1/1971 | Grill | ................. F28D 9/0025 |
| | | | | 165/DIG. 399 |
| 6,601,438 B2 | * | 8/2003 | Gerner | ................. G01N 30/30 |
| | | | | 73/61.52 |
| 2014/0060163 A1 | * | 3/2014 | Watanabe | ............ G01N 30/30 |
| | | | | 137/334 |

FOREIGN PATENT DOCUMENTS

| JP | 57-189052 A | 11/1982 |
| JP | 2011-106833 A | 6/2011 |
| JP | 2018-150562 A | 9/2018 |
| JP | 2022-071658 A | 3/2022 |

OTHER PUBLICATIONS

Office Action for corresponding Chinese Patent Application No. 202210040628.9 dated Jul. 7, 2023, with English machine translation.

\* cited by examiner

*Primary Examiner* — Benjamin L Lebron
(74) *Attorney, Agent, or Firm* — Renner, Otto, Boisselle & Sklar, LLP

(57) ABSTRACT

A detector for a liquid chromatograph includes a detector that detects components in liquid, and a heat exchanger that adjusts a temperature of liquid introduced into the detector, wherein the heat exchanger includes a pipe having a winding portion, and a cast in which the winding portion is embedded, the pipe is formed of resin, and the cast is formed of an alloy having a melting point lower than a continuous use temperature of the resin.

8 Claims, 5 Drawing Sheets

DETECTOR FOR LIQUID CHROMATOGRAPH

BACKGROUND

Technical Field

The present invention relates to a detector for a liquid chromatograph.

Description of Related Art

In a liquid chromatograph, a detector such as an electric conductance detector is used to detect sample components in a liquid mobile phase. For example, JP 57-189052 U describes an electrical conductance detector in which the entire flow cell is stored in an aluminum block. In the aluminum block, a heat exchange tube formed of stainless, and a cartridge heater are embedded.

SUMMARY

In a case where a pipe formed of stainless is used in a detector for a liquid chromatograph, liquid activity may change when liquid such as a mobile phase comes into contact with stainless. Thus, target ions are adsorbed to the inside of the pipe and then desorbed from the pipe. In this case, in a chromatogram generated by the detector for a liquid chromatograph, a ghost peak caused by adsorbed ions and a ghost peak caused by desorbed ions are generated.

An object of the present invention is to provide a detector for a liquid chromatograph, that enables prevention of generation of a ghost peak while ensuring temperature stability.

A detector for a liquid chromatograph according to one aspect includes a detector that detects components in liquid, and a heat exchanger that adjusts a temperature of liquid introduced into the detector, wherein the heat exchanger includes a pipe having a winding portion, and a cast in which the winding portion is embedded, the pipe is formed of resin, and the cast is formed of an alloy having a melting point lower than a continuous use temperature of the resin.

Other features, elements, characteristics, and advantages of the present disclosure will become more apparent from the following description of preferred embodiments of the present disclosure with reference to the attached drawings.

DETAILED DESCRIPTION

A detector for a liquid chromatograph, according to embodiments of the present invention will be described below in detail with reference to the drawings.

(1) Configuration of Liquid Chromatograph

Figure 1:
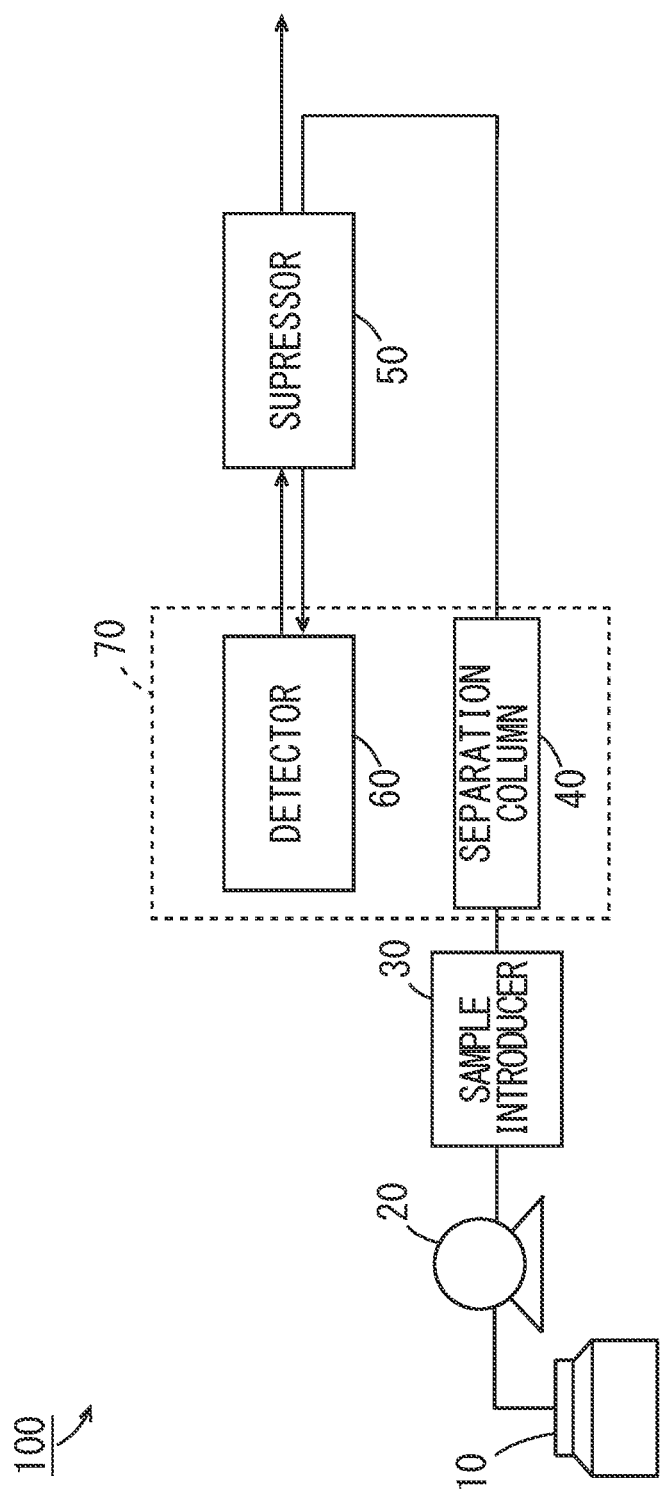
FIG. 1 is a diagram showing the configuration of a liquid chromatograph including a detector for a liquid chromatograph according to embodiments.

FIG. 1 is a diagram showing the configuration of a liquid chromatograph including the detector for a liquid chromatograph according to one embodiment. The liquid chromatograph according to the present embodiment is an ion chromatograph.

The liquid chromatograph 100 of FIG. 1 includes a pump 20, a sample introducer 30, a separation column 40, a suppressor 50, an electrical conductance detector (hereinafter abbreviated as a detector) 60 and a column oven 70. The separation column 40 and the detector 60 are contained in the column oven 70.

The pump 20 sucks an eluent from an eluent container 10 and guides the sucked eluent to the separation column 40. The sample introducer 30 introduces a sample into the eluent guided to the separation column 40 from the pump 20. Thus, the eluent and the sample are introduced into the separation column 40. The separation column 40 separates the introduced sample into components. The eluent including the sample that has been separated into components is introduced into the suppressor 50. Further, the eluent led out from the suppressor 50 is introduced into the suppressor 50 again through the detector 60 and then discarded.

The suppressor 50 includes an ion exchange membrane. The suppressor 50 exchange ions which are not to be analyzed out of ions in the eluent introduced from the separation column 40 and ions which are to be analyzed out of ions in the eluent introduced from the detector 60 through the ion exchange membrane. Thus, the eluent from which unnecessary ion components that are not be analyzed are removed is guided to the detector 60. The detector 60 detects sample components in the eluent.

(2) Configuration of Detector 60

Figure 2:
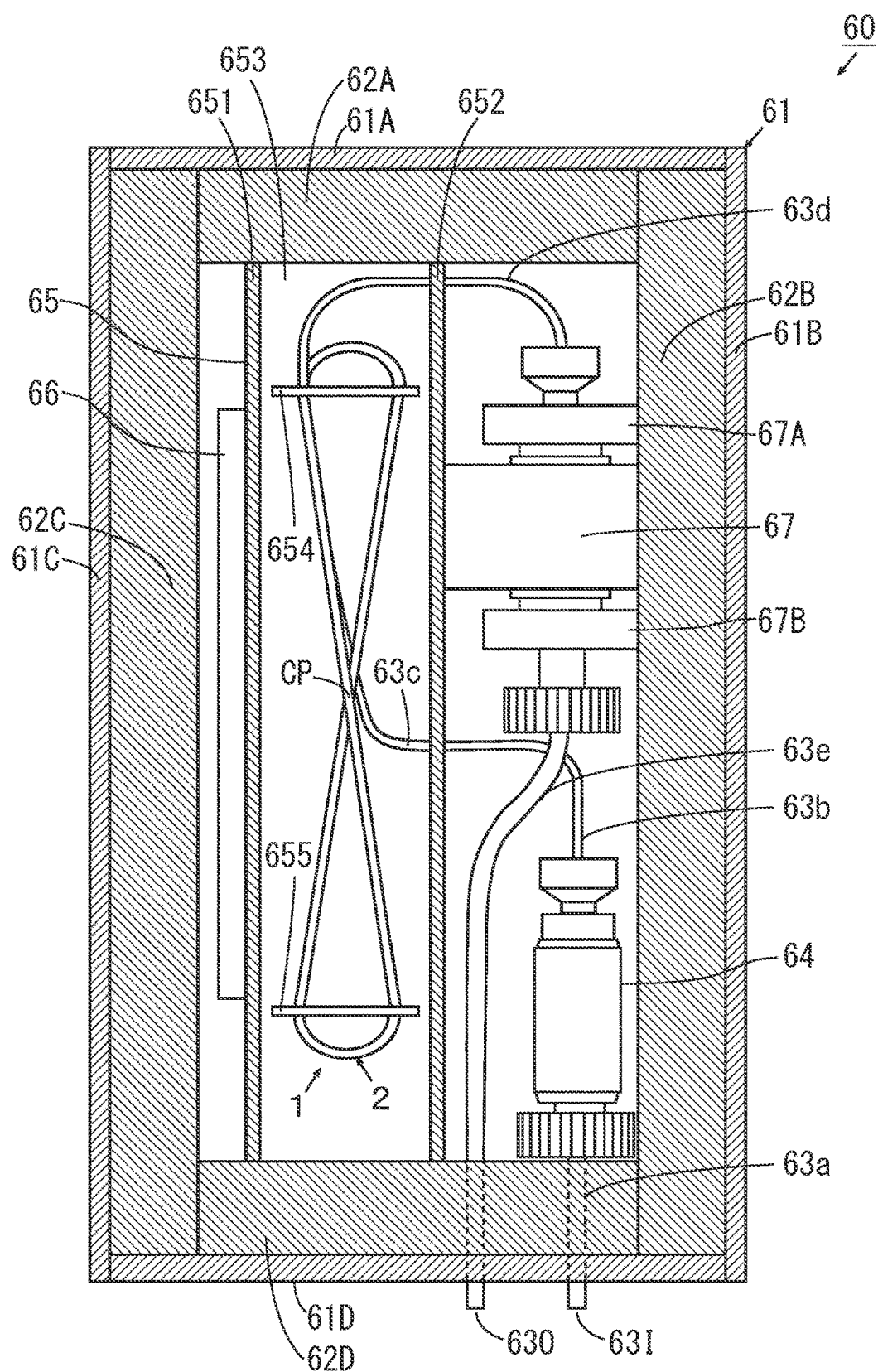
FIG. 2 is a schematic front cross sectional view showing the configuration of the detector.

FIG. 2 is a schematic front cross sectional view showing the configuration of the detector 60. As shown in FIG. 2, the detector 60 includes a casing 61, a plurality of plate-shape thermal insulators 62A to 62D, a plurality of pipes 63a to 63e, a coupling 64, a heat exchange block 65, a temperature adjuster 66 and a detector 67. The detector 67 has electrodes 67A, 67B.

The casing 61 is constituted by an upper plate 61A, side plates 61B, 61C, a bottom plate 61D, a front plate (not shown) and a back plate (not shown). The thermal insulators 62A to 62D are respectively arranged to extend along the upper plate 61A, the side plates 61B, 61C, the bottom plate 61D, the front plate and the back plate in the casing 61. In the casing 61, the plurality of pipes 63a to 63e, the coupling 64, the heat exchange block 65, the temperature adjuster 66 and the detector 67 are contained.

The pipes 63a to 63e are formed of resin having chemical resistance and heat resistance. A resin having chemical resistance and heat resistance is a ketone resin or a fluorine resin, for example. For example, PEEK (polyetheretherketone) is used as a ketone resin. For example, PTFE (polytetrafluoroethylene) or PFA (perfluoroalkoxy alkanes) is used as a fluorine resin. In the present embodiment, the pipes 63a to 63e are formed of PEEK. The continuous use temperature of PEEK is about 250° C. The continuous use temperature of PTFE and PFA is about 260° C.

The pipe 63a penetrates the bottom plate 61D and the thermal insulator 62D from outside of the casing 61 to extend into the casing 61. One end of the pipe 63a outside of the casing 61 is referred to as a pipe inlet 63I. The other end of the pipe 63a is connected to one end of the coupling 64. The pipe 63b is drawn out from the heat exchange block 65. The end portion of the pipe 63b is connected to the other end of the coupling 64. The pipe 63c winds and is contained in the heat exchange block 65 as described below. A portion in which the pipe 63c winds in the heat exchange block 65 is referred to as a winding portion 1. Details of the configuration of the heat exchange block 65 will be described below.

The pipe 63d is drawn out from the heat exchange block 65. The end portion of the pipe 63d is inserted into the detector 67 through the electrode 67A. The pipe 63e is drawn out from the detector 67 through the electrode 67B. The pipe 63e penetrates the thermal insulator 62D and the bottom plate 61D to extend to the outside of the casing 61. The end portion of the pipe 63e is referred to as a pipe outlet 63O. The pipes 63b, 63c, 63d are formed continuously and integrally.

An eluent guided from the suppressor 50 to the pipe inlet 63I is guided to the pipe 63c in the heat exchange block 65 through the coupling 64 and the pipe 63b. The temperature adjuster 66 includes a temperature sensor and a heater. The temperature adjuster 66 is provided to extend along the side surface of the heat exchange block 65 and keeps the temperature of the heat exchange block 65 at a predetermined temperature. Thus, the temperature of the eluent flowing through the pipe 63c in the heat exchange block 65 is kept constant.

In this state, the eluent led out from the pipe 63c in the heat exchange block 65 is guided to the detector 67 through the pipe 63d. A voltage is applied to the electrodes 67A, 67B. In this state, a change in current value in accordance with an ion concentration of the eluent flowing between the electrode 67A and the electrode 67B is measured. Thus, a change in current value is measured as a change in electrical conductance, so that sample components in the eluent are detected. The eluent led out from the detector 67 is guided to the pipe outlet 63O through the pipe 63e to be introduced into the suppressor 50.

(3) Configuration of Heat Exchange Block 65

Figure 3:
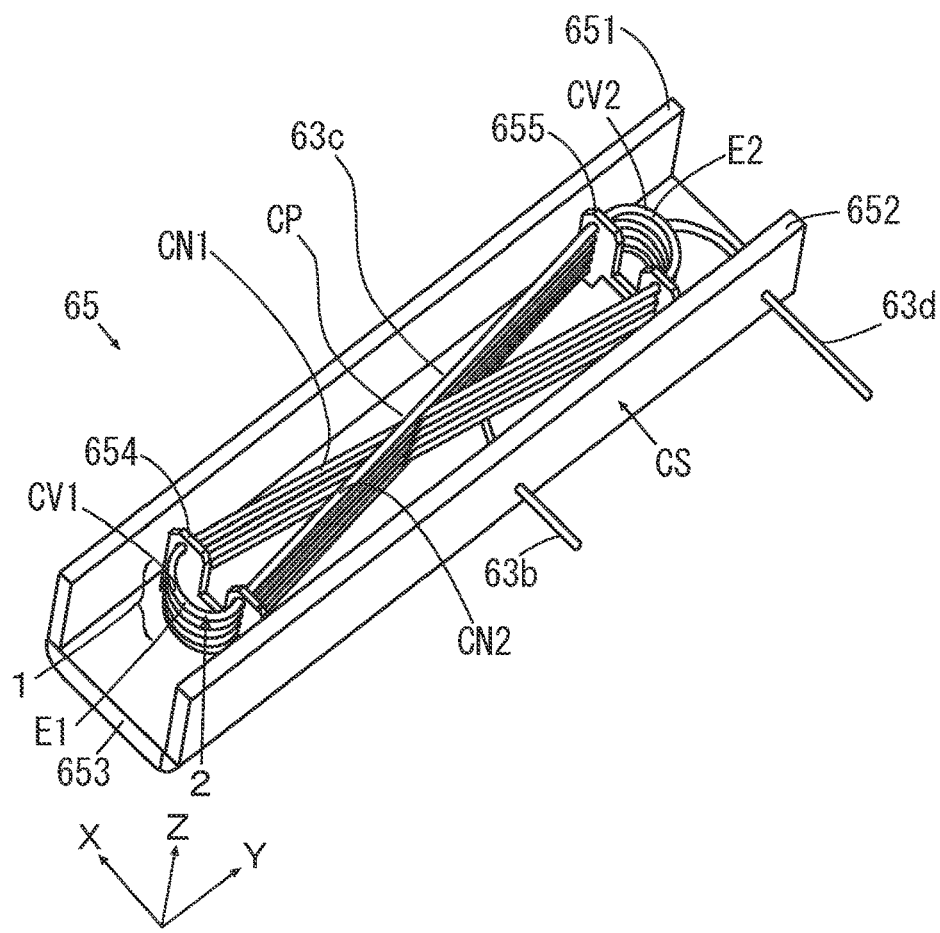
FIG. 3 is a perspective view showing the inner configuration of a heat exchange block of FIG. 2.
Figure 4:
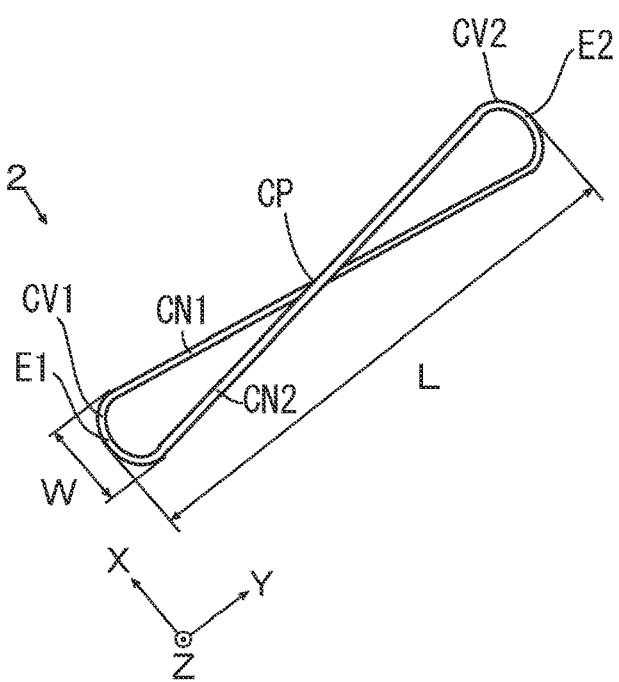
FIG. 4 is a diagram for explaining the shape of a winding portion.
Figure 5:
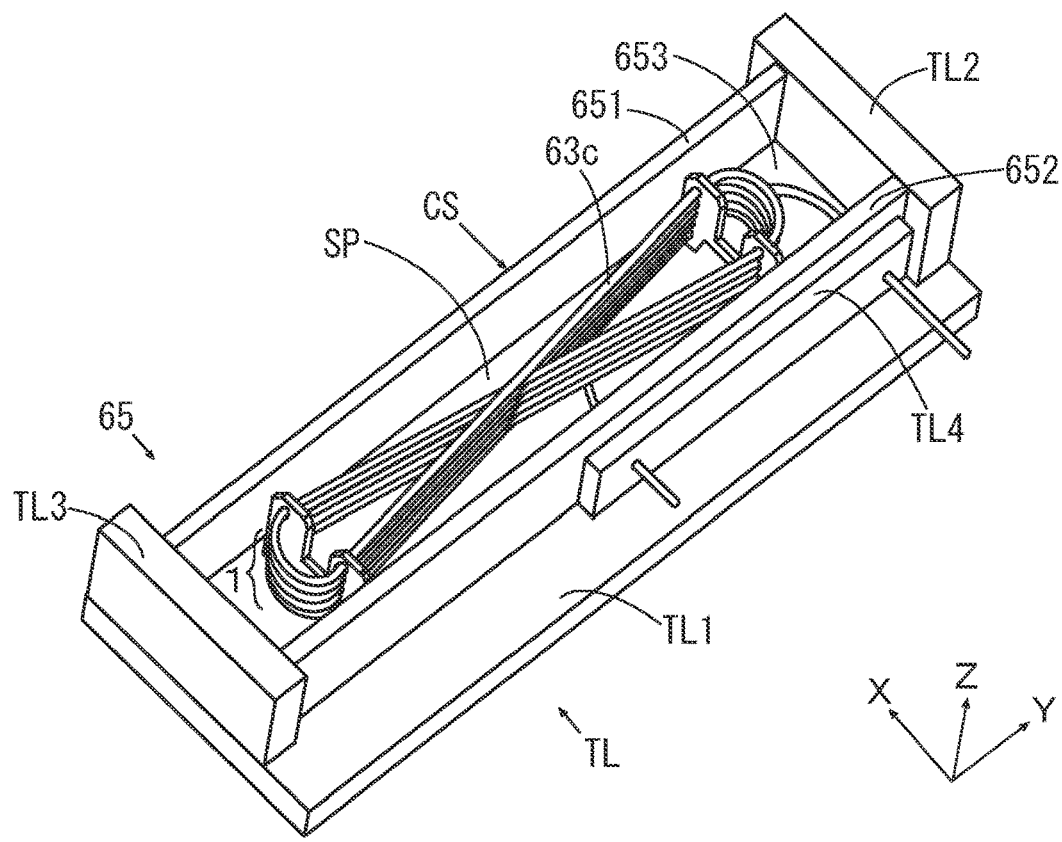
FIG. 5 is a perspective view for explaining a method of manufacturing a cast of a heat exchange block.
Figure 6:
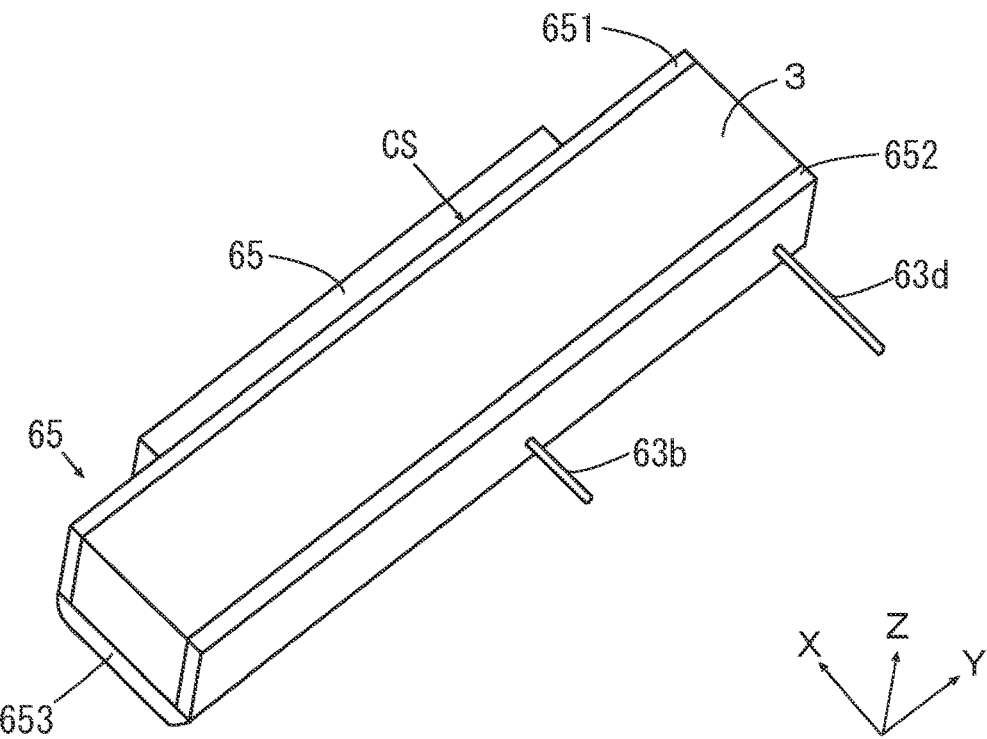
FIG. 6 is a perspective view of the cast of the heat exchange block.

FIG. 3 is a perspective view showing the inner configuration of the heat exchange block 65 of FIG. 2. FIG. 4 is a diagram for explaining the shape of a winding portion 1. FIG. 5 is a perspective view for explaining a method of manufacturing the heat exchange block 65. FIG. 6 is an external perspective view of the heat exchange block 65. In FIGS. 3 to 6, the arrows indicating an X direction, a Y direction and a Z direction, which are orthogonal to one another, are depicted.

As shown in FIG. 3, the heat exchange block 65 includes a casing CS extending in the Y direction. The casing CS has a pair of side plates 651, 652 and one bottom plate 653. The pair of side plates 651, 652 is arranged in parallel with the Y direction and the Z direction to be opposite to each other. A pair of long sides of the bottom plate 653 is joined to the long sides of the pair of side plates 651, 652. The winding portion 1 of the pipe 63c is contained in the space surrounded by the pair of side plates 651, 652 and the bottom plate 653.

The winding portion 1 is formed when portions of the pipe 63c are stacked in the Y direction while the pipe 63c winds. A portion of the pipe 63c corresponding to one winding layer in the winding portion 1 is referred to as a winding pipe portion 2. In the present embodiment, the winding portion 1 is constituted by the plurality of winding pipe portions 2. The plurality of winding pipe portions 2 are connected to one another.

The plurality of winding pipe portions 2 have a first end portion E1 and a second end portion E2 that are spaced apart from each other in the Y direction. Each of the plurality of winding pipe portions 2 has a first curving pipe portion CV1, a second curving pipe portion CV2, a first coupling pipe portion CN1 and a second coupling pipe portion CN2. The first and second curving pipe portions CV1, CV2 have a semi-circular shape. The first and second coupling pipe portions CN1, CN2 have a linear shape. The first curving pipe portion CV1 has one end and the other end. The first end portion E1 is located in the intermediate position between the one end and the other end of the first curving pipe portion CV1. Similarly, the second curving pipe portion CV2 has one end and the other hand. The second end portion E2 is located at the intermediate position between the one end and the other end of the first curving pipe portion CV1.

The coupling pipe portion CN1 extends from the one end of the first curving pipe portion CV1 to the other end of the second curving pipe portion CV2. The coupling pipe portion CN2 extends from the other end of the first curving pipe portion CV1 to the one end of the second curving pipe portion CV2. Thus, the coupling pipe portion CN1 and the coupling pipe portion CN2 cross each other, and a cross portion CP is formed at the intermediate position between the first end portions E1 and the second end portions E2 of the plurality of winding pipe portions 2 in the Y direction. As shown in FIG. 4, the distance L between the first end portion E1 and the second end portion E2 of each winding pipe portion 2 in the Y direction is larger than the maximum width W of each winding pipe portion 2 in the X direction.

A pair of holding pieces 654, 655 is fixed to the bottom plate 653 of the casing CS. The first curving pipe portions CV1 of the plurality of winding pipe portion 2 are held by the holding piece 654. The second curving pipe portions CV2 of the plurality of winding pipe portions 2 are held by the holding piece 655.

Here, a method of manufacturing the heat exchange block 65 will be described. As shown in FIG. 5, a jig TL is used when the heat exchange block 65 is manufactured. The jig TL includes a base jig TL1, closing jigs TL2, TL3 and a fixing jig TL4.

The fixing jig TL4 is attached to the base jig TL1. The casing CS containing the winding portion 1 of the pipe 63c of FIG. 4 is placed on the base jig TL1 to extend along the fixing jig TL4. The pair of closing jigs TL2, TL3 is attached to the base jig TL1 to close openings at the both ends of the casing CS. In the casing CS, a cuboid space SP surrounded by the casing CS and the closing jigs TL2, TL3 is formed.

In this state, a melted alloy is poured into the space SP. In this case, an alloy having a melting point lower than the continuous use temperature of the pipe 63c is used. Thus, as shown in FIG. 6, a cast 3 including the winding portion 1 of the pipe 63c is formed. For example, various low melting point solders that do not contain lead can be used as an alloy. In the present embodiment, a Sn—Ag—Cu based solder containing Sn (tin), Ag (silver) and Cu (copper) is used as an alloy. A melting point (liquid phase line) of the Sn—Ag—Cu based solder used in the present embodiment is about 220° C. Another solder such as an Sn—Ag—In (indium) —Bi (bismuth) based solder, an Sn—Cu based solder or an Sn—Zn (zinc) —Bi based solder may be used. In particular, a solder not containing lead is preferably used. Further, another alloy having a melting point lower than the continuous use temperature of the pipe 63c may be used.

Thereafter, the temperature adjuster 66 is attached to the side plate 651 of the casing CS of the heat exchange block 65.

(4) Effects of Embodiments

With the detector 60 for a liquid chromatograph according to the present embodiment, because the pipes 63a to 63e are formed of a ketone resin or a fluorine resin having heat resistance and chemical resistance, ions are unlikely to be adsorbed to the pipes 63a to 63e. Thus, in a chromatogram, generation of a ghost peak caused by adsorbed ions and a ghost peak caused by desorbed ions is suppressed. Further, because the cast 3 in which the plurality of winding pipe portions 2 of the pipe 63c are embedded is formed of a low melting point alloy, the pipe 63c is prevented from being melted when the cast 3 is cast. Further, because the cast 3 formed of a low melting point alloy has high thermal conductivity, heat is transferred quickly to the plurality of winding pipe portions 2 of the pipes 63c in the cast 3 when the temperature is adjusted by the temperature adjuster 66. Therefore, generation of a ghost peak can be prevented while temperature stability is ensured.

Further, the distance L between the first end portion E1 and the second end portion E2 of the plurality of winding pipe portions 2 in the Y direction is larger than the maximum width W of the plurality of winding pipe portions 2 in the X direction. Thus, as compared to a case where the pipe 63c winds in a cylindrical shape, the number of times the pipe 63c winds in the plurality of winding pipe portions 2 can be reduced. Thus, the dimension of the plurality of winding pipe portions 2 in the Z direction can be reduced. Therefore, the heat transfer efficiency between the alloy in the inner region of the plurality of winding pipe portions 2 and the alloy outside of the plurality of winding pipe portions 2 is good. Therefore, responsiveness in the temperature adjustment of the plurality of winding pipe portions 2 of the pipe 63c is enhanced. As a result, the temperature stability of liquid guided from the heat exchange block 65 to the detector 67 can be sufficiently ensured.

Further, it is possible to increase the length of each winding pipe portion 2 of the pipe 63c without increasing the distance L between the first end portions E1 and the second end portions E2 of the plurality of winding pipe portions 2. Thus, the temperature stability can be improved without an increase in size of the heat exchange block 65.

Further, each of the plurality of winding pipe portions 2 is constituted by the first curving pipe portion CV1, the second curving pipe portion CV2, the first coupling pipe portion CN1 and the second coupling pipe portion CN2, and the cross portion CP is constituted by the first coupling pipe portion CN1 and the second coupling pipe portion CN2. In this case, it is possible to increase the length of the first coupling pipe portion CN1 and the second coupling pipe portion CN2 without increasing the distance L between the first curving pipe portion CV1 and the second curving pipe portion CV2 in the Y direction. Thus, the temperature stability can be improved without an increase in size of the heat exchange block 65.

Further, because the temperature adjuster 66 is provided to extend along the side plate 651 extending in the Y direction of the heat exchange block 65, heat is transferred to the plurality of first coupling pipe portions CN1 and the plurality of second coupling pipe portions CN2 in the plurality of winding pipe portions 2 of the pipe 63c in the cast 3. Thus, heat is transferred quickly to the liquid flowing through the plurality of winding pipe portions 2 of the pipe.

In particular, in a case where being formed of PEEK, PTFE or PFA, the pipes 63a to 63e can have chemical resistance against many types of liquid and have a high continuous use temperature. Thus, the type of a usable mobile phase is not limited, and a selection range in regard to the type of an alloy constituting the cast 3 is enlarged.

Figure 7:
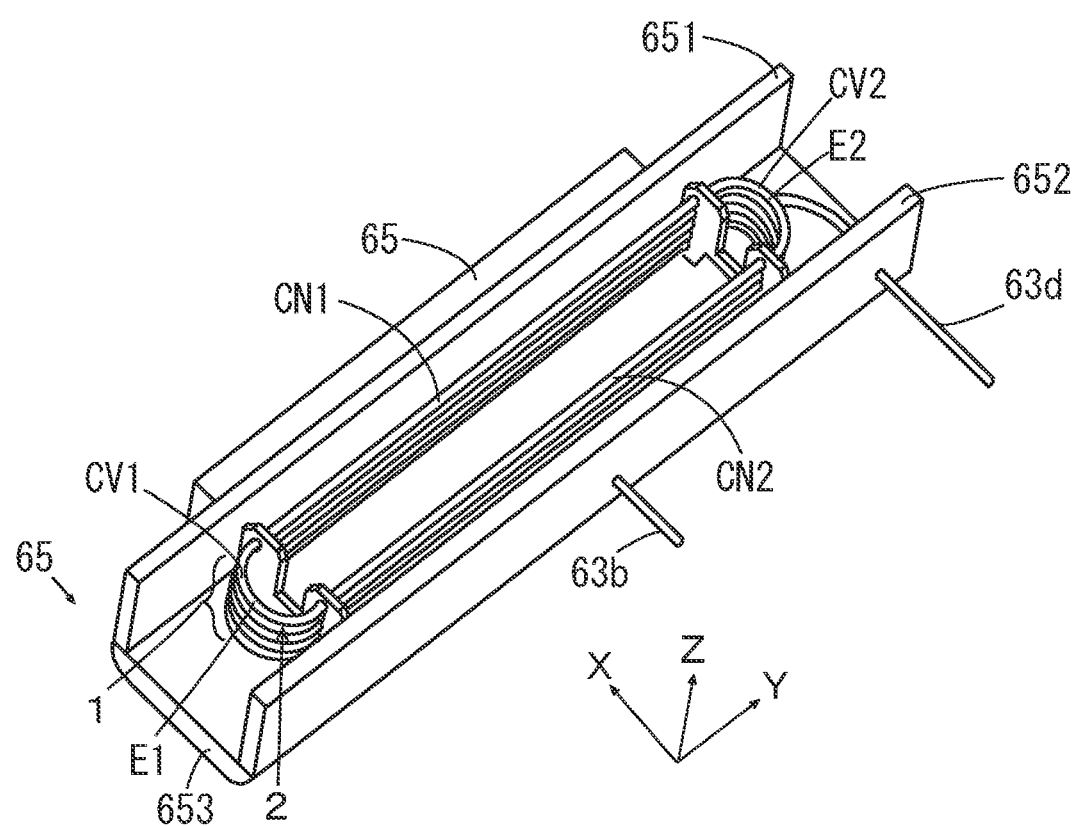
FIG. 7 is a perspective view showing the inner configuration of a heat exchange block according to another embodiment.

(5) Other Embodiments (a) While the plurality of winding pipe portions 2 respectively have the cross portions CP in the above-mentioned embodiment, the present invention is not limited to this. FIG. 7 is a perspective view showing the inner configuration of a heat exchange block 65 according to another embodiment.

As shown in FIG. 7, a first coupling pipe portion CN1 extends from one end of a first curving pipe portion CV1 to one end of a second coupling pipe portion CN2. The second coupling pipe portion CN2 extends from the other end of the first curving pipe portion CV1 to the other end of the second curving pipe portion CV2. In this case, the first coupling pipe portion CN1 and the second coupling pipe portion CN1 extend in parallel with each other and do not have a cross portion. Thus, a plurality of winding pipe portions 2 is oblong.

(b) While the winding portion 1 includes the plurality of winding pipe portions 2 in the above-mentioned embodiment, a single winding pipe portion 2 may be provided in a case where the temperature of a pipe 63c is sufficiently stable.

(c) While the temperature adjuster 66 is provided to extend along the side plate 652 in the above-mentioned embodiment, the present invention is not limited to this. The temperature adjuster 66 may be provided to extend along a bottom plate 653 or the side plate 652, for example.

(d) While being an electrical conductance detector in the above-mentioned embodiment, the detector for a chromatograph may be another detector such as a fluorescence detector or a differential refractometer.

(6) Correspondences between Constituent Elements in Claims and Parts in Preferred Embodiments In the following paragraphs, non-limiting examples of correspondences between various elements recited in the claims below and those described above with respect to various preferred embodiments of the present disclosure are explained. In the above-mentioned embodiment, the Z direction is an example of a first direction, the Y direction is an example of a second direction, the X direction is an example of a third direction, and the heat exchange block 65 is an example of a heat exchanger.

(7) Aspects

It is understood by those skilled in the art that the plurality of above-mentioned illustrative embodiments are specific examples of the below-mentioned aspects.

(Item 1) A detector for a liquid chromatograph according to one aspect may include a detector that detects components in liquid, and a heat exchanger that adjusts a temperature of liquid introduced into the detector, wherein the heat exchanger may include a pipe having a winding portion, and a cast in which the winding portion is embedded, the pipe may be formed of resin, and the cast may be formed of an alloy having a melting point lower than a continuous use temperature of the resin.

With the detector for a liquid chromatograph according to the one aspect, because the pipe is formed of resin, ions are unlikely to be adsorbed to the pipe. Thus, in a chromatogram, generation of a ghost peak caused by adsorbed ions and a ghost peak caused by desorbed ions is suppressed. Further, because the alloy cast in which the winding portion of the pipe is embedded has a melting point lower than the continuous use temperature of the pipe, the pipe is prevented from being melted when an alloy is cast. Further, because the alloy cast has high thermal conductivity, heat is transferred quickly to the winding portion of the pipe in the cast during temperature adjustment. Therefore, generation of a ghost peak can be prevented while the temperature stability is ensured.

(Item 2) The detector for a liquid chromatograph according to item 1, wherein the winding portion of the pipe may include a plurality of winding pipe portions that are connected to one another and stacked in a first direction, the plurality of winding pipe portions may have first end portions and second end portions that are spaced apart from each other in a second direction that intersects with the first direction, and a maximum width of the plurality of winding pipe portions in a third direction that intersects with the first direction and the second direction may be smaller than a distance between the first end portions and the second end portions of the plurality of winding pipe portions.

With the detector for a liquid chromatograph according to item 2, the distance between the first end portion and the second end portion of the plurality of winding portions is larger than the maximum width in the third direction. Thus, because the number of times the pipe winds in the winding portion can be reduced as compared to a case where the pipe winds in a cylindrical shape, the dimension of the winding portion in a stacking direction can be reduced. Therefore, the heat transfer efficiency between the alloy in the inner region of the winding portion and the alloy present outside of the winding portion is good. Thus, responsiveness in temperature adjustment of the winding portion of the pipe is increased. As a result, temperature stability of liquid guided from the heat exchanger to the detector can be sufficiently ensured.

(Item 3) The detector for a liquid chromatograph according to item 2, wherein each of the plurality of winding pipe portions may have a cross portion between the first end portion and the second end portion.

With the detector for a liquid chromatograph according to item 3, it is possible to increase the length of each winding pipe portion of the pipe without increasing the distance between the first end portion and the second end portion of the winding portion. Thus, the temperature stability can be improved without an increase in size of the heat exchanger.

(Item 4) The detector for a liquid chromatograph according to item 3, wherein each of the plurality of winding portions may have a first curving pipe portion including the first end portion, a second curving pipe portion including the second end portion, a first coupling pipe portion located between the first curving pipe portion and the second curving pipe portion, and a second coupling pipe portion located between the first curving pipe portion and the second curving pipe portion, each of the first and second curving pipe portions may have one end and another end in the third direction, the first coupling pipe portion may extend from the one end of the first curving pipe portion to the another end of the second curving pipe portion, the second coupling pipe portion may extend from the another end of the first curving pipe portion to the one end of the second curving pipe portion, and the first and second coupling pipe portions may constitute the cross portion at which the first and second coupling pipe portions cross each other between the first end portion and the second end portion.

With the detector for a liquid chromatograph according to item 4, each of the plurality of winding pipe portions is constituted by the first curving pipe portion, the second curving pipe portion, the first coupling pipe portion and the second coupling pipe portion, and the cross portion is constituted by the first coupling pipe portion and the second coupling pipe portion. In this case, it is possible to increase the length of the first and second coupling pipe portions without increasing the distance between the first curving pipe portion and the second curving pipe portion. Thus, the temperature stability can be improved without an increase in size of the heat exchanger.

(Item 5) The detector for a liquid chromatograph according to any one of items 2 to 4 may further includes a temperature adjuster that adjusts a temperature of the winding portion of the pipe, wherein the cast may have a side surface extending in the second direction, and the temperature adjuster may be provided to extend along the side surface.

With the detector for a liquid chromatograph according to item 5, because the temperature adjuster is provided to extend along the side surface extending in the second direction, heat is transferred to a long portion of the winding portion of the pipe in the cast. Thus, heat is transferred quickly to the liquid flowing through the winding portion of the pipe.

(Item 6) The detector for a liquid chromatograph according to any one of items 1 to 5, wherein the pipe may be formed of a ketone resin or a fluorine resin.

With the detector for a liquid chromatograph according to item 6, the pipe has chemical resistance against many types of liquid and can have high continuous use temperature. Thus, the type of a usable mobile phase is not limited, and the selection range in regard to the type of an alloy constituting the cast is enlarged.

(Item 7) The detector for a liquid chromatograph according to any one of items 1 to 6, wherein the pipe may be formed of polyetheretherketone, polytetrafluoroethylene or perfluoroalkoxy alkanes.

With the detector for a liquid chromatograph according to item 7, the pipe has chemical resistance against many types of liquid and can have high continuous use temperature. Thus, the type of a usable mobile phase is not limited, and the selection range in regard to the type of an alloy constituting the cast is enlarged.

(Item 8) The detector for a liquid chromatograph according to any one of items 1 to 7, wherein the alloy may be a solder.

With the detector for a liquid chromatograh according to item 8, because a solder has a relatively low melting point, the selection range in regard to the type of resin forming the pipe is enlarged. Further, the detector for a liquid chromatograph can be produced relatively inexpensively.

While preferred embodiments of the present disclosure have been described above, it is to be understood that variations and modifications will be apparent to those skilled in the art without departing the scope and spirit of the present disclosure. The scope of the present disclosure, therefore, is to be determined solely by the following claims.

I claim:

1. A detector for a liquid chromatograph comprising:
   a detector that detects components in liquid; and
   a heat exchanger that adjusts a temperature of liquid introduced into the detector, wherein
   the heat exchanger includes
   a pipe having a winding portion, and
   a cast in which the winding portion is embedded,
   the pipe is formed of resin, and
   the cast is formed of an alloy having a melting point lower than a continuous use temperature of the resin.

2. The detector for a liquid chromatograph according to claim 1, wherein the winding portion of the pipe includes a plurality of winding pipe portions that are connected to one another and stacked in a first direction, the plurality of winding pipe portions has first end portions and second end portions that are spaced apart from each other in a second direction that intersects with the first direction, and a maximum width of the plurality of winding pipe portions in a third direction that intersects with the first direction and the second direction is smaller than a distance between the first end portions and the second end portions of the plurality of winding pipe portions.

3. The detector for a liquid chromatograph according to claim 2, wherein each of the plurality of winding pipe portions has a cross portion between the first end portion and the second end portion.

4. The detector for a liquid chromatograph according to claim 3, wherein each of the plurality of winding portions has a first curving pipe portion including the first end portion, a second curving pipe portion including the second end portion, a first coupling pipe portion located between the first curving pipe portion and the second curving pipe portion, and a second coupling pipe portion located between the first curving pipe portion and the second curving pipe portion, each of the first and second curving pipe portions has one end and another end in the third direction, the first coupling pipe portion extends from the one end of the first curving pipe portion to the another end of the second curving pipe portion, the second coupling pipe portion extends from the another end of the first curving pipe portion to the one end of the second curving pipe portion, and the first and second coupling pipe portions constitute the cross portion at which the first and second coupling pipe portions cross each other between the first end portion and the second end portion.

5. The detector for a liquid chromatograph according to claim 2, further comprising a temperature adjuster that adjusts a temperature of the winding portion of the pipe, wherein the cast has a side surface extending in the second direction, and the temperature adjuster is provided to extend along the side surface.

6. The detector for a liquid chromatograph according to claim 1, wherein the pipe is formed of a ketone resin or a fluorine resin.

7. The detector for a liquid chromatograph according to claim 1, wherein the pipe is formed of polyetheretherketone, polytetrafluoroethylene or perfluoroalkoxy alkanes.

8. The detector for a liquid chromatograph according to claim 1, wherein the alloy is a solder.

\* \* \* \* \*